United States Patent Office.

JOHN M. THOMPSON, OF SALTILLOVILLE, INDIANA.

Letters Patent No. 73,939, dated January 28, 1868.

MEDICAL COMPOUND.

*The Schedule referred to in these Letters Patent and making part of the same.*

TO ALL WHOM IT MAY CONCERN:

Be it known that I, JOHN M. THOMPSON, of Saltilloville, in the county of Washington, and in the State of Indiana, have invented certain new and useful Improvements in Compound for Curing Cholera and other diseases; and do hereby declare that the following is a full, clear, and exact description thereof.

To prepare this mixture, I first take a half pound of blackberry-root, a half pound ragweed-leaves, and a half pound of white-oak bark, and place them in a half gallon of water. I boil these to a strong decoction of one and a half pint when strained off. To this decoction I add—

1. Gum kino, one ounce.
2. Gum-guiacum, two ounces.
3. Capsicum, one and one-half drachm.
4. Acetate of lead, one drachm.
5. Gum-opium, one and a half ounce.
6. Pressed chalk, one ounce.
7. Tannin, one-half ounce.
8. Cloves, ground, two ounces.
9. Cinnamon, ground, two ounces.

Alcohol, .98 of one-half gallon.

The nine ingredients named before the alcohol are first dissolved in the alcohol, and then the decoction is mixed in gradually. Sufficient water is now added to make one gallon of the cholera-mixture, and it is ready for use.

What I claim, is the within-described mixture, compounded as and for the purpose set forth.

In testimony that I claim the foregoing, I have hereunto set my hand, this 6th day of November, 1867.

JOHN M. THOMPSON.

Witnesses:
WILLIAM A. ELLIOTT,
JACOB J. ANDREW.